June 26, 1934.    C. PLACKE    1,964,212
CIRCUIT CLOSER
Filed Sept. 4, 1931
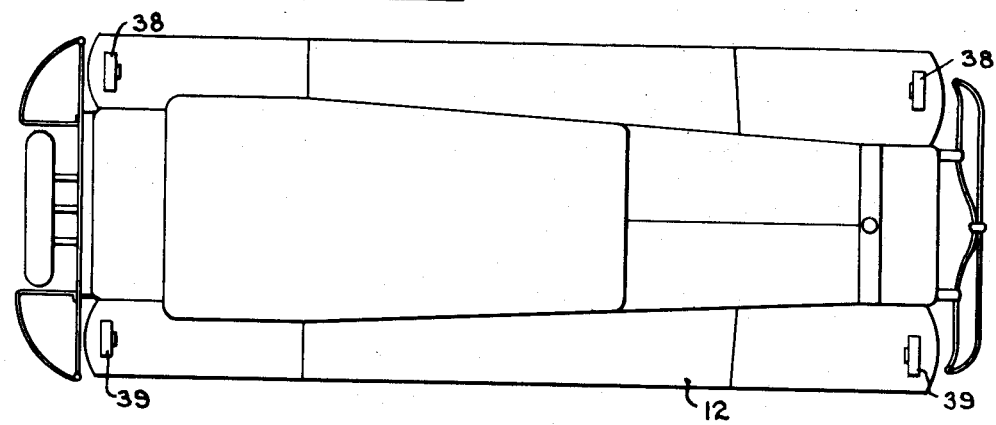
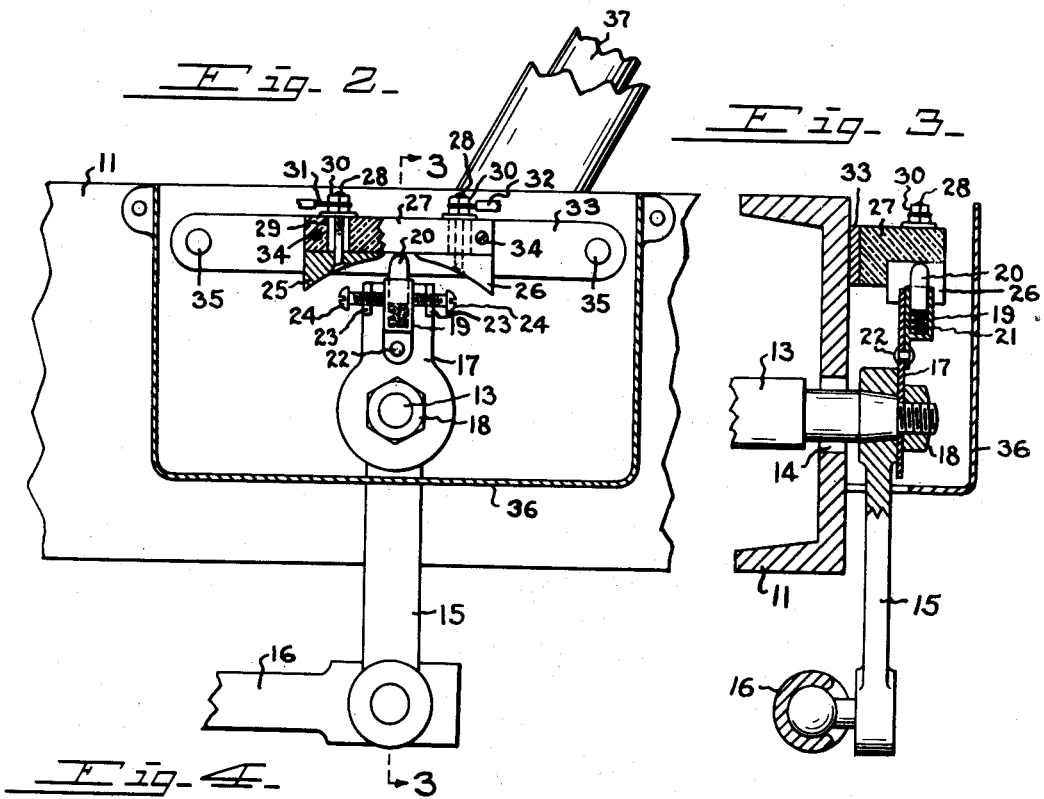
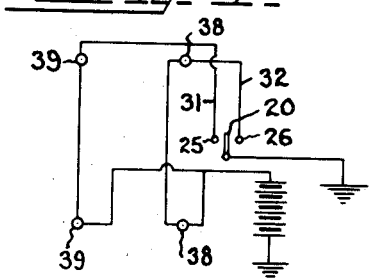
INVENTOR.
CLEM PLACKE.
BY H.C. Karel.
ATTORNEY.

UNITED STATES PATENT OFFICE 1,964,212

CIRCUIT CLOSER

Clem Placke, West Covington, Ky.

Application September 4, 1931, Serial No. 561,208

1 Claim. (Cl. 200—59)

This invention relates to a signalling device controlled by the movement of the steering wheel of an automobile for the purpose of indicating the direction the vehicle intends to turn by illuminating a light on that side of the vehicle corresponding to the direction of movement.

The object of the invention is to provide a switch operable through movement of the steering shaft. A further object is to provide the switch with adjustable contact points whereby the amount of movement of the steering shaft to create a contact between the brush and the contact part, can be governed. A further object is to provide an adjustable brush whereby the brush can be adjusted with relation to the contacts.

The invention will be further readily understood from the following description and claim and from the drawing in which latter:

Fig. 1 is a plan view of an automobile showing the signalling lamps,

Fig. 2 is a side view of my improved switch partly in section and partly broken away, Fig. 3 is a vertical section of the same taken on the line 3—3 of Fig. 2, and;

Fig. 4 is a diagrammatic view of the wiring for the device.

My device is adapted to be installed on the frame 11 of an automobile 12. The pitman arm shaft 13, in most makes of automobiles extends through an aperture 14 in the frame and has the usual pitman arm 15 which connects with the drag link 16 for controlling the front wheels of the automobile. In my device, I provide an arm 17 which I prefer to clamp to the pitman arm shaft 13 by means of the usual nut 18. Pivoted to the arm 17 is a brush holder 19 in which a suitable piece of carbon 20 is received. A spring 21 tends to force the carbon stick outwardly. The holder 19 is pivoted to the arm 17 by means of a rivet 22. The arm 17 is provided with extending lugs 23 in which screws 24 are threaded for maintaining the holder 19 in the desired adjusted position relative to the arm 17. Above the brush are contacts 25 and 26 adjustably secured to insulating block 27 by means of contact posts 28 received in elongated slots 29 in the insulating block. Suitable nuts 30 clamp the contact part to the insulating block and also hold wires 31 and 32, leading to the indicating lamps, in place. The insulated block 27 is suitably secured to a strap 33 by means of screws 34. This strap in turn is secured to the frame by means of rivets 35. A guard housing 36 is positioned about the switch to prevent dirt and grease from interfering with the operation of the switch.

In operating the device, when the steering wheel is turned either to the right or left, the steering shaft 37 is rotated causing rotation of the pitman shaft 13 which causes the arm 17 to move either to the right or left, corresponding to the movement of the steering wheel. When the arm 17 is thus moved in either direction, the brush 20 contacts one or the other of the contact parts for forming an electrical circuit for lighting a pair of direction lights 38 or 39 on the side of the vehicle in which direction the steering wheel is turning.

The contacts can be adjusted to a very narrow span, whereby a slight movement of the steering wheel will cause the brush 20 to contact one or the other of the contact parts to cause illumination of one of the sets of lights. Thus a person driving a vehicle desiring to indicate the direction he intends to turn can turn slightly to bring the vehicle at a gradual angle toward the intersection in the direction that he desires to turn thus notifying other vehicles of his intention to make a turn.

Having thus fully described my invention, what I claim is new and desire to secure by Letters Patent, is:

A switch for a direction indicator on a vehicle comprising in combination a pitman shaft, a movable arm fixed to said shaft, a spring pressed brush pivoted on said arm, an insulated block mounted on said vehicle, a pair of contacts mounted on said insulating block, a pair of lugs on said arm and a pair of screws threaded in said lugs and bearing on opposite sides of said brush for locating said brush relative to said arm.

CLEM PLACKE.